United States Patent

[11] 3,628,020

| [72] | Inventor | Alain Briand<br>Grenoble, France |
|---|---|---|
| [21] | Appl. No. | 820,733 |
| [22] | Filed | May 1, 1969 |
| [45] | Patented | Dec. 14, 1971 |
| [73] | Assignee | Commissariat A'L'Energie Atomique<br>Paris, France |
| [32] | Priority | May 21, 1968 |
| [33] | | France |
| [31] | | 152 624 |

[54] THERMAL NEUTRON SOURCE
8 Claims, 1 Drawing Fig.

| [52] | U.S. Cl. | 250/84.5,<br>176/10 |
|---|---|---|
| [51] | Int. Cl. | G21c 3/00 |
| [50] | Field of Search | 176/10;<br>250/84.5, 83.1 |

[56] References Cited
UNITED STATES PATENTS

| 3,050,624 | 8/1962 | Janner | 250/83.1 |
|---|---|---|---|
| 3,089,958 | 5/1963 | Janner | 250/83.1 |
| 3,393,125 | 7/1968 | Jackson | 250/83.1 |

*Primary Examiner*—Reuben Epstein
*Attorney*—Craig, Antonelli, Stewart & Hill

ABSTRACT: A temperature-controlled thermal neutron source for modifying the energy of neutrons supplied by a nuclear reactor core. A block of neutron-moderating material enclosed in a leaktight casing is placed within the reactor. The block casing forms an extension of a reactor shield plug which closes an access hole and is connected to an external vacuum pump via a passageway through the shield plug. The passageway serves as a guide for high-frequency waves which are transmitted from the exterior to the neutron-moderating block. The temperature of the block can thus be varied, thereby permitting a correlative variation in the energy of neutrons which traverse the block.

PATENTED DEC 14 1971 3,628,020
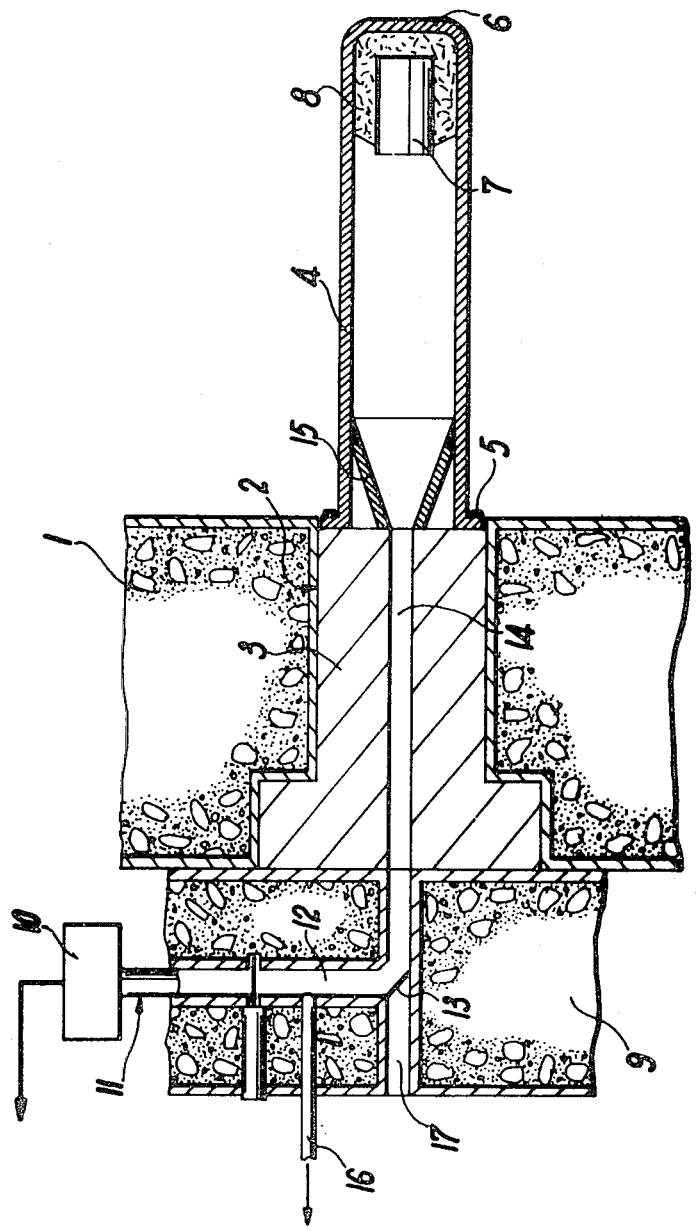
INVENTOR
ALAIN BRIAND
BY
Craig, Antonelli, Stewart & Hill  ATTORNEYS

THERMAL NEUTRON SOURCE

The present invention relates to a thermal neutron source having a controllable temperature and so designed that the energy of neutrons supplied by a nuclear reactor core may be modified at will.

To this end, said source is characterized in that it comprises a block of neutron-moderating material which is placed within the interior of a reactor in proximity to the biological shield of said reactor in front of a plug which seals off an access hole through said shield, a vacuumtight casing surrounding said block and forming an extension of the plug within the interior of the reactor, a guide comprising a portion which passes axially through the plug and terminates within the casing and a wave emitter located outside the reactor shield in order to deliver waves through the interior of said guide in the direction of said neutron-moderating block.

The neutrons which emanate from the reactor core and are slowed down by the moderating block are directed after passing through the guide towards a measurement of experimentation apparatus which is located outside the biological shield. The energy of said neutrons can be adjusted by means of a variation in the temperature of the moderating block, this variation being produced by the waves which are transmitted from the emitter to said block and absorbed by this latter.

Apart from this main feature, a neutron source designed in accordance with the invention also has a number of related properties which will be discussed in greater detail hereinafter, particularly in regard to the following points which are to be considered either separately or in combination:

— the emitter is a centimeter wave emitter constituted especially by an industrial heating magnetron of either the continuous or noncontinuous type which supplies an adjustable high-frequency power,
— the emitter is a microwave emitter constituted by a laser rod,
— the emitter is constituted by an arc furnace associated with a parabolic mirror which reflects in the direction of the neutron-moderating block,
— the guide is closed at the end remote from the vacuumtight casing and is connected to an installation for producing a vacuum,
— the guide is associated at the end which opens into the vacuumtight casing with an adapter which provides a transition with said casing,
— the neutron-moderating block is placed against the base of the vacuumtight casing and is surrounded laterally by a layer of heat-insulating material,
— the guide is mounted within a protective support structure provided with an exit passage forming an extension of that portion of the guide which traverses the shield plug.

The invention will now be disclosed in greater detail in the following complementary description relating to one embodiment which is given by way of example and not in any sense by way of limitation, reference being made to the single FIGURE of the accompanying drawings which represents a diagrammatic sectional view of a neutron source as constructed in accordance with the invention.

The source which is shown in this FIGURE is intended for the production of thermal neutrons of variable energy, these neutrons being derived from a nuclear reactor core (not shown) which is located in the FIGURE on the right-hand side of a biological shield wall 1. A through-hole 2 which provides access to the reactor core is formed in said shield wall and is normally closed by a plug 3 formed of material having a high density and serving as a barrier to the neutrons which are produced. Said plug 3 is extended axially in the direction of the reactor core by a metallic thimble 4 which is preferably of cylindrical shape, said thimble being formed especially of aluminum and rigidly fixed to the plug 3 by means of clamping screws 5. A block 7 formed of neutron-moderating material and in particular of graphite is mounted against the base 6 of said thimble. Said block 7 is preferably surrounded by a suitable layer 8 of heat-insulating material formed of graphite felt or the like. A supporting structure 9 which is also formed of neutron-absorbing material, especially lead or concrete, is placed outside the reactor in proximity to the shield wall 1 and against the plug 3. Said support structure 9 is associated with an emitter which, in the example of construction which is more especially considered, consists of an industrial heating magnetron 10 which transmits centimeter waves through the interior of a guide 11 with a continuously adjustable power. The guide has a first portion 12 which is joined by means of a reflecting element 13 to a second portion 14 located at right angles to the first and adapted to pass axially through the plug 3 so as to open into the metallic thimble 4 opposite to the neutron-moderating block 7. The transition between the portion 14 of the guide and the thimble 4 is provided by a cone 15 which is welded to the internal surface of the thimble. The guide 11 as a whole is connected by means of a pipe 16 to a pumping installation (not shown in the FIGURE) for producing a vacuum within the interior of said guide. Finally, an exit duct 17 is provided within the support structure 9 in the line of extension of the portion 14 of the guide so that the neutrons which are derived from the reactor core and which have traversed the moderating block 7 are permitted to pass out of the apparatus in order to be directed towards a control device which can be diffractometer, a spectrometer or any other suitable experimentation apparatus for the purpose in particular of taking measurements of absorption cross sections of certain materials.

Thus, by varying the high-frequency energy of the waves generated by the magnetron 10 and transmitted through the guide 11 to the neutron-moderating block 7, continuous or noncontinuous control of the temperature of said block is accordingly achieved, thereby producing action on the neutrons which traverse the block and causing a correlative variation in neutron energy. There is thus provided a high-temperature hot neutron source which can readily be controlled from the exterior of the reactor.

It is wholly apparent that the invention is not limited in any respect to the form of construction as described and illustrated solely by way of example but extends on the contrary to all alternative forms. In particular, the magnetron which has been proposed for the production of centimeter waves could be replaced by a microwave laser rod or even by an arc furnace from which radiation would be transmitted by a parabolic mirror mounted in place of the element 13 which reflects in the direction of the neutron-moderating block 7 in order to produce continuous action on the temperature of said block.

What I claim is:

1. A thermal neutron source having a controllable temperature, characterized in that it comprises a block of neutron-moderating material which is placed within the interior of a reactor in proximity to the biological shield of said reactor in front of a plug which seals off an access hole through said shield, a vacuumtight casing surrounding said block and forming an extension of the plug within the interior of the reactor, a guide comprising a portion which passes axially through the plug land terminates within the casing and a wave emitter located outside the reactor shield in order to deliver waves through the interior of said guide in the direction of said neutron-moderating block.

2. A neutron source in accordance with claim 1, characterized in that the emitter is a centimeter-wave emitter constituted by an industrial heating magnetron which supplies an adjustable high-frequency power.

3. A neutron source is accordance with claim 1, characterized in that the emitter is a microwave emitter constituted by a laser rod.

4. A neutron source in accordance with claim 1, characterized in that the emitter is constituted by an arc furnace associated with a parabolic mirror which reflects in the direction of the neutron-moderating block.

5. A neutron source in accordance with claim 1, characterized in that the guide is closed at the end remote from the vacuumtight casing and is connected to an installation for producing a vacuum.

6. A neutron source in accordance with claim 1, characterized in that the guide is associated at the end which opens into the vacuumtight casing with an adapter which provides a transition with said casing.

7. A neutron source in accordance with claim 1, characterized in that the neutron-moderating block is placed against the base of the vacuumtight casing and is surrounded laterally by a layer of heat-insulating material.

8. A neutron source in accordance with claim 1, characterized in that the guide is mounted within a protective support structure provided with a neutron exit passage forming an extension of that portion of the guide which traverses the shield plug.

* * * * *